US012581396B2

(12) United States Patent (10) Patent No.: US 12,581,396 B2
Deng et al. (45) Date of Patent: Mar. 17, 2026

(54) TECHNIQUES FOR BAND PRIORITY UTILIZATION FOR CELL SCANNING

(71) Applicant: QUALCOMM Incorporated, San Diego, CA (US)

(72) Inventors: Jun Deng, Shanghai (CN); Nitin Pant, San Diego, CA (US); Manjinder Singh Sandhu, Poway, CA (US); Hewu Gu, Shanghai (CN); Sushmita Suresh Rao, San Diego, CA (US); Tom Chin, San Diego, CA (US); Xin Jiang, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 18/002,607

(22) PCT Filed: Jul. 30, 2021

(86) PCT No.: PCT/CN2021/109695
§ 371 (c)(1),
(2) Date: Dec. 20, 2022

(87) PCT Pub. No.: WO2022/033330
PCT Pub. Date: Feb. 17, 2022

(65) Prior Publication Data
US 2023/0239772 A1 Jul. 27, 2023

(30) Foreign Application Priority Data

Aug. 14, 2020 (WO) ................ PCT/CN2020/109119

(51) Int. Cl.
*H04W 48/16* (2009.01)
*H04B 7/06* (2006.01)
(Continued)

(52) U.S. Cl.
CPC ........ *H04W 48/16* (2013.01); *H04B 7/06952* (2023.05); *H04W 72/542* (2023.01); *H04W 72/56* (2023.01)

(58) Field of Classification Search
None
See application file for complete search history.

(56) References Cited

U.S. PATENT DOCUMENTS 12,089,245 B2 9/2024 Santhanam et al.
2009/0270103 A1 10/2009 Pani et al.
(Continued)

FOREIGN PATENT DOCUMENTS

CN 103906181 A 7/2014
CN 107318150 A 11/2017
(Continued)

OTHER PUBLICATIONS

Supplementary European Search Report—EP21855383—Search Authority—Munich—Aug. 19, 2024.
(Continued)

*Primary Examiner* — Walter J Divito
(74) *Attorney, Agent, or Firm* — Harrity & Harrity, LLP

(57) ABSTRACT

Various aspects of the present disclosure generally relate to wireless communication. In some aspects, a user equipment (UE) may obtain a band priority list identifying a set of bands in a prioritized order. The UE may perform a system scan of one or more bands of a frequency list that are associated with at least a threshold energy level in the prioritized order of the one or more bands in the band priority list. Numerous other aspects are described.

35 Claims, 10 Drawing Sheets

(51) Int. Cl.
H04W 72/542 (2023.01)
H04W 72/56 (2023.01)

(56) References Cited

U.S. PATENT DOCUMENTS

| | | | | |
|---|---|---|---|---|
| 2012/0094679 A1* | 4/2012 | Rao | H04W 48/16 | 455/450 |
| 2014/0080475 A1 | 3/2014 | Gholmieh et al. | | |
| 2014/0148170 A1* | 5/2014 | Damji | H04W 48/16 | 455/437 |
| 2014/0357268 A1 | 12/2014 | Dubey et al. | | |
| 2015/0271718 A1 | 9/2015 | Gopal et al. | | |
| 2016/0073309 A1* | 3/2016 | Iwanaga | H04W 36/08 | 370/331 |
| 2017/0265205 A1* | 9/2017 | HomChaudhuri | H04B 7/0413 | |
| 2017/0280422 A1 | 9/2017 | Prabhakar et al. | | |
| 2017/0289886 A1 | 10/2017 | Shirahatti et al. | | |
| 2018/0063751 A1 | 3/2018 | Shi et al. | | |
| 2019/0319686 A1* | 10/2019 | Chen, IV | H04B 7/0617 | |
| 2020/0077325 A1 | 3/2020 | Jangid et al. | | |

FOREIGN PATENT DOCUMENTS

| | | | |
|---|---|---|---|
| CN | 108605283 A | 9/2018 | |
| CN | 111432455 A | 7/2020 | |
| WO | 2014168426 A1 | 10/2014 | |
| WO | 2019209486 A1 | 10/2019 | |
| WO | 2020050978 A1 | 3/2020 | |
| WO | 2022098949 A1 | 5/2022 | |

OTHER PUBLICATIONS

AT&T: "DL Beam Management Details", 3GPP TSG RAN WG1 Meeting #89, R1-1707750, Hangzhou, China, May 15, 2017-May 19, 2017, 4 Pages, May 19, 2017 (May 19, 2017) the whole document.

International Search Report and Written Opinion—PCT/CN2020/109119 —ISA/EPO—May 12, 2021.

International Search Report and Written Opinion—PCT/CN2021/109695—ISA/EPO—Oct. 28, 2021.

* cited by examiner

610 Determine, based at least in part on a set of priorities for a set of bands of a band priority list, an order for scanning the set of bands 620 Scan the set of bands using the order for scanning the set of bands

600

910    Obtain a band priority list for a set of bands

920    Scan the set of bands of the band priority list in a prioritized order associated with a set of priorities for the set of bands and a suitability criterion

900

1010 — Obtain a band priority list identifying a set of bands in a prioritized order 1020 — Perform a system scan of one or more bands of a frequency list that are associated with at least a threshold energy level in the prioritized order of the one or more bands in the band priority list

1000

TECHNIQUES FOR BAND PRIORITY UTILIZATION FOR CELL SCANNING

CROSS-REFERENCE TO RELATED APPLICATIONS

This Patent Application is a 371 National Phase of Patent Cooperation Treaty PCT) Patent Application No. PCT/CN2021/109695, filed Jul. 30, 2021, entitled "TECHNIQUES FOR BAND PRIORITY UTILIZATION FOR CELL SCANNING," and claims priority to PCT Patent Application No. PCT/CN2020/109119, filed on Aug. 14, 2020, entitled "TECHNIQUES FOR BAND PRIORITY UTILIZATION FOR CELL SCANNING," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for band priority utilization for cell scanning.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining, based at least in part on a set of priorities for a set of bands of a band priority list, an order for scanning the set of bands; and scanning the set of bands using the order for scanning the set of bands.

In some aspects, scanning the set of bands comprises at least one of a band scan or a system scan. In some aspects, at least one band, of the set of bands, is not associated with a priority of the set of priorities; and the determination of the order for scanning the set of bands comprises: determining a position of the at least one band within the order for scanning the set of bands based at least in part on an energy level. In some aspects, the determination of the order for scanning the set of bands includes determining the order for scanning the set of bands based at least in part on a set of energy levels of the set of bands. In some aspects, the determination of the order for scanning the set of bands includes determining the order for scanning the set of bands based at least in part on a set of suitability criteria for the set of bands.

In some aspects, the method includes reselecting to a cell based at least in part on scanning the set of bands. In some aspects, the cell is an anchor cell. In some aspects, the method includes acquiring a cell based at least in part on scanning the set of bands. In some aspects, the cell is acquired based at least in part on an energy level of the cell satisfying a threshold. In some aspects, the method includes determining the threshold based at least in part on: a stored value, a call flow scenario, a coverage metric, a minimum value, a maximum value, a connection event, or an increment value.

In some aspects, the method includes determining a new order for scanning a subset of the set of bands based at least in part on respective energy levels of the subset of the set of bands. In some aspects, the determination of the order for scanning the set of bands includes determining the order for scanning the set of bands based at least in part on a set of timestamps of the set of bands. In some aspects, the determination of the order for scanning the set of bands includes determining a prioritization of a set of acquisition candidates based at least in part on the set of priorities for the set of bands.

In some aspects, the method includes receiving information identifying the band priority list. In some aspects, the band priority list is dynamically configured based at least in part one or more network measurements. In some aspects, the band priority list is based at least in part on: an E-Utra New Radio Dual Connectivity (ENDC) capability, a throughput capability, or a band range capability.

In some aspects, a UE for wireless communication includes a memory and one or more processors coupled to the memory, the memory and the one or more processors configured to: determine, based at least in part on a set of priorities for a set of bands of a band priority list, an order for scanning the set of bands; and scan the set of bands using the order for scanning the set of bands.

In some aspects, the one or more processors, when scanning the set of bands, are configured to a band scan or a system scan. In some aspects, at least one band, of the set of bands, is not associated with a priority of the set of priorities; and the determination of the order for scanning the set of bands includes determining a position of the at least one band within the order for scanning the set of bands based at least in part on an energy level. In some aspects, the determination of the order for scanning the set of bands includes determining the order for scanning the set of bands based at least in part on a set of energy levels of the set of bands. In some aspects, the determination of the order for scanning the set of bands includes determining the order for scanning the set of bands based at least in part on a set of suitability criteria for the set of bands.

In some aspects, the one or more processors are further configured to reselect to a cell based at least in part on scanning the set of bands. In some aspects, the cell is an anchor cell. In some aspects, the one or more processors are further configured to: acquire a cell based at least in part on scanning the set of bands. In some aspects, the cell is acquired based at least in part on an energy level of the cell satisfying a threshold. In some aspects, the one or more processors are further configured to determine the threshold based at least in part on: a stored value, a call flow scenario, a coverage metric, a minimum value, a maximum value, a connection event, or an increment value.

In some aspects, the one or more processors are further configured to determine a new order for scanning a subset of the set of bands based at least in part on respective energy levels of the subset of the set of bands. In some aspects, the determination of the order for scanning the set of bands includes determining the order for scanning the set of bands based at least in part on a set of timestamps of the set of bands. In some aspects, the determination of the order for scanning the set of bands includes determining a prioritization of a set of acquisition candidates based at least in part on the set of priorities for the set of bands.

In some aspects, the one or more processors are further configured to receive information identifying the band priority list. In some aspects, the band priority list is dynamically configured based at least in part one or more network measurements. In some aspects, the band priority list is based at least in part on: an ENDC capability, a throughput capability, or a band range capability.

In some aspects, a non-transitory computer-readable medium storing a set of instructions for wireless communication includes one or more instructions that, when executed by one or more processors of a UE, cause the UE to: determine, based at least in part on a set of priorities for a set of bands of a band priority list, an order for scanning the set of bands; and scan the set of bands using the order for scanning the set of bands.

In some aspects, the one or more instructions, that cause the UE to scan the set of bands, cause the UE to a band scan or a system scan. In some aspects, at least one band, of the set of bands, is not associated with a priority of the set of priorities; and the determination of the order for scanning the set of bands includes determining a position of the at least one band within the order for scanning the set of bands based at least in part on an energy level. In some aspects, the determination of the order for scanning the set of bands includes determining the order for scanning the set of bands based at least in part on a set of energy levels of the set of bands.

In some aspects, the determination of the order for scanning the set of bands includes determining the order for scanning the set of bands based at least in part on a set of suitability criteria for the set of bands. In some aspects, the one or more instructions further cause the UE to reselect to a cell based at least in part on scanning the set of bands. In some aspects, the cell is an anchor cell. In some aspects, the one or more instructions further cause the UE to: acquire a cell based at least in part on scanning the set of bands.

In some aspects, the cell is acquired based at least in part on an energy level of the cell satisfying a threshold. In some aspects, the one or more instructions further cause the UE to determine the threshold based at least in part on: a stored value, a call flow scenario, a coverage metric, a minimum value, a maximum value, a connection event, or an increment value. In some aspects, the one or more instructions further cause the UE to determine a new order for scanning a subset of the set of bands based at least in part on respective energy levels of the subset of the set of bands.

In some aspects, the determination of the order for scanning the set of bands includes determining the order for scanning the set of bands based at least in part on a set of timestamps of the set of bands. In some aspects, the determination of the order for scanning the set of bands includes determining a prioritization of a set of acquisition candidates based at least in part on the set of priorities for the set of bands. In some aspects, the one or more instructions further cause the UE to receive information identifying the band priority list. In some aspects, the band priority list is dynamically configured based at least in part one or more network measurements. In some aspects, the band priority list is based at least in part on: an ENDC capability, a throughput capability, or a band range capability.

In some aspects, an apparatus for wireless communication includes: means for determining, based at least in part on a set of priorities for a set of bands of a band priority list, an order for scanning the set of bands; and means for scanning the set of bands using the order for scanning the set of bands.

In some aspects, the means for scanning the set of bands comprises at least one of means for a band scan or means for a system scan. In some aspects, at least one band, of the set of bands, is not associated with a priority of the set of priorities; and the determination of the order for scanning the set of bands includes means for determining a position of the at least one band within the order for scanning the set of bands based at least in part on an energy level. In some aspects, the determination of the order for scanning the set of bands includes means for determining the order for scanning the set of bands based at least in part on a set of energy levels of the set of bands.

In some aspects, the determination of the order for scanning the set of bands includes means for determining the order for scanning the set of bands based at least in part on a set of suitability criteria for the set of bands. In some aspects, the apparatus includes means for reselecting to a cell based at least in part on scanning the set of bands. In some aspects, the cell is an anchor cell. In some aspects, the apparatus includes means for acquiring a cell based at least in part on scanning the set of bands.

In some aspects, the cell is acquired based at least in part on an energy level of the cell satisfying a threshold. In some aspects, the apparatus includes means for determining the threshold based at least in part on: a stored value, a call flow scenario, a coverage metric, a minimum value, a maximum value, a connection event, or an increment value. In some aspects, the apparatus includes means for determining a new order for scanning a subset of the set of bands based at least in part on respective energy levels of the subset of the set of bands.

In some aspects, the means for determining the order for scanning the set of bands includes means for determining the order for scanning the set of bands based at least in part on a set of timestamps of the set of bands. In some aspects, the means for determining the order for scanning the set of bands includes means for determining a prioritization of a set of acquisition candidates based at least in part on the set of priorities for the set of bands. In some aspects, the apparatus includes means for receiving information identifying the band priority list. In some aspects, the band priority list is dynamically configured based at least in part one or more network measurements. In some aspects, the band priority list is based at least in part on: an ENDC capability, a throughput capability, or a band range capability.

Some aspects described herein relate to a method of wireless communication performed by a UE. The method may include obtaining a band priority list for a set of bands. The method may include scanning the set of bands of the band priority list in a prioritized order associated with a set of priorities for the set of bands and a suitability criterion.

In some aspects, the band priority list includes a frequency list. In some aspects, the frequency list is based at least in part on at least one of: an acquisition data set, an inter-radio access technology data set, an inter-frequency data set, a configured data set, or a visited cell data set. In some aspects, scanning the set of bands comprises at least one of a band scan or a system scan. In some aspects, the method includes determining a position of at least one band within the prioritized order for scanning the set of bands based at least in part on an energy level of the at least one band.

In some aspects, the scanning the set of bands is a system scan that is to occur before a band scan of the band priority list. In some aspects, at least one band, of the set of bands, is not associated with a priority of the set of priorities, and the determination of the order for scanning the set of bands comprises determining a position of the at least one band within the order for scanning the set of bands based at least in part on an energy level. In some aspects, the method includes determining the order for scanning the set of bands based at least in part on a set of energy levels of the set of bands. In some aspects, the method includes determining the order for scanning the set of bands based at least in part on a set of suitability criteria for the set of bands.

In some aspects, the method includes reselecting to a cell based at least in part on scanning the set of bands. In some aspects, the cell is an anchor cell. In some aspects, the method includes acquiring a cell based at least in part on scanning the set of bands. In some aspects, the cell is acquired based at least in part on an energy level of the cell satisfying a threshold. In some aspects, the method includes determining the threshold based at least in part on: a stored value, a call flow scenario, a coverage metric, a minimum value, a maximum value, a connection event, or an increment value. In some aspects, the method includes determining a new order for scanning a subset of the set of bands based at least in part on respective energy levels of the subset of the set of bands.

In some aspects, the method includes determining the order for scanning the set of bands based at least in part on a set of timestamps of the set of bands. In some aspects, the method includes determining a prioritization of a set of acquisition candidates based at least in part on the set of priorities for the set of bands. In some aspects, the method includes receiving information identifying the band priority list. In some aspects, the band priority list is dynamically configured based at least in part one or more network measurements. In some aspects, the band priority list is based at least in part on: an ENDC capability, a throughput capability, or a band range capability.

Some aspects described herein relate to a UE for wireless communication. The UE may include a memory and one or more processors coupled to the memory. The one or more processors may be configured to obtain a band priority list for a set of bands. The one or more processors may be configured to scan the set of bands of the band priority list in a prioritized order associated with a set of priorities for the set of bands and a suitability criterion. In some aspects, the band priority list includes a frequency list. In some aspects, the frequency list is based at least in part on at least one of: an acquisition data set, an inter-radio access technology data set, an inter-frequency data set, a configured data set, or a visited cell data set.

In some aspects, the one or more processors, to scan the set of bands, are configured to a band scan or a system scan. In some aspects, the one or more processors are further configured to: determine a position of at least one band within the prioritized order for scanning the set of bands based at least in part on an energy level of the at least one band. In some aspects, the scanning the set of bands is a system scan that is to occur before a band scan of the band priority list. In some aspects, at least one band, of the set of bands, is not associated with a priority of the set of priorities; and the determination of the order for scanning the set of bands comprises: determine a position of the at least one band within the order for scanning the set of bands based at least in part on an energy level. In some aspects, the one or more processors are further configured to determine the order for scanning the set of bands based at least in part on a set of energy levels of the set of bands.

In some aspects, the one or more processors are further configured to determine the order for scanning the set of bands based at least in part on a set of suitability criteria for the set of bands. In some aspects, the one or more processors are further configured to reselect to a cell based at least in part on scanning the set of bands. In some aspects, the cell is an anchor cell. In some aspects, the one or more processors are further configured to acquire a cell based at least in part on scanning the set of bands. In some aspects, the cell is acquired based at least in part on an energy level of the cell satisfying a threshold. In some aspects, the one or more processors are further configured to determine the threshold based at least in part on: a stored value, a call flow scenario, a coverage metric, a minimum value, a maximum value, a connection event, or an increment value.

In some aspects, the one or more processors are further configured to determine a new order for scanning a subset of the set of bands based at least in part on respective energy levels of the subset of the set of bands. In some aspects, the one or more processors are further configured to determine the order for scanning the set of bands based at least in part on a set of timestamps of the set of bands. In some aspects, the one or more processors are further configured to determine a prioritization of a set of acquisition candidates based at least in part on the set of priorities for the set of bands. In some aspects, the one or more processors are further configured to receive information identifying the band priority list. In some aspects, the band priority list is dynamically configured based at least in part one or more network measurements. In some aspects, the band priority list is based at least in part on: an ENDC capability, a throughput capability, or a band range capability.

Some aspects described herein relate to a non-transitory computer-readable medium that stores a set of instructions for wireless communication by a UE. The set of instructions, when executed by one or more processors of the UE, may cause the UE to obtain a band priority list for a set of bands.

The set of instructions, when executed by one or more processors of the UE, may cause the UE to scan the set of bands of the band priority list in a prioritized order associated with a set of priorities for the set of bands and a suitability criterion. In some aspects, the band priority list includes a frequency list. In some aspects, the frequency list is based at least in part on at least one of: an acquisition data set, an inter-radio access technology data set, an inter-frequency data set, a configured data set, or a visited cell data set. In some aspects, the one or more instructions, that cause the UE to scan the set of bands, cause the UE to perform a band scan or a system scan.

In some aspects, the one or more instructions further cause the UE to: determine a position of at least one band within the prioritized order for scanning the set of bands based at least in part on an energy level of the at least one band. In some aspects, the scanning the set of bands is a system scan that is to occur before a band scan of the band priority list. In some aspects, at least one band, of the set of bands, is not associated with a priority of the set of priorities, and the one or more instructions further cause the UE to determine a position of the at least one band within the order for scanning the set of bands based at least in part on an energy level. In some aspects, the one or more instructions further cause the UE to determine the order for scanning the set of bands based at least in part on a set of energy levels of the set of bands. In some aspects, the one or more instructions further cause the UE to determine the order for scanning the set of bands based at least in part on a set of suitability criteria for the set of bands. In some aspects, the one or more instructions further cause the UE to reselect to a cell based at least in part on scanning the set of bands. In some aspects, the cell is an anchor cell. In some aspects, the one or more instructions further cause the UE to acquire a cell based at least in part on scanning the set of bands.

In some aspects, the cell is acquired based at least in part on an energy level of the cell satisfying a threshold. In some aspects, the one or more instructions further cause the UE to determine the threshold based at least in part on: a stored value, a call flow scenario, a coverage metric, a minimum value, a maximum value, a connection event, or an increment value. In some aspects, the one or more instructions further cause the UE to determine a new order for scanning a subset of the set of bands based at least in part on respective energy levels of the subset of the set of bands. In some aspects, the one or more instructions further cause the UE to determine the order for scanning the set of bands based at least in part on a set of timestamps of the set of bands. In some aspects, the one or more instructions further cause the UE to determine a prioritization of a set of acquisition candidates based at least in part on the set of priorities for the set of bands. In some aspects, the one or more instructions further cause the UE to receive information identifying the band priority list. In some aspects, the band priority list is dynamically configured based at least in part one or more network measurements. In some aspects, the band priority list is based at least in part on: an ENDC capability, a throughput capability, or a band range capability.

Some aspects described herein relate to an apparatus for wireless communication. The apparatus may include means for obtaining a band priority list for a set of bands. The apparatus may include means for scanning the set of bands of the band priority list in a prioritized order associated with a set of priorities for the set of bands and a suitability criterion. In some aspects, the band priority list includes a frequency list. In some aspects, the frequency list is based at least in part on at least one of: an acquisition data set, an inter-radio access technology data set, an inter-frequency data set, a configured data set, or a visited cell data set. In some aspects, the means for scanning the set of bands comprises at least one of means for a band scan or a system scan. In some aspects, the apparatus includes means for determining a position of at least one band within the prioritized order for scanning the set of bands based at least in part on an energy level of the at least one band. In some aspects, the apparatus includes means for occurring before a band scan of the band priority list.

In some aspects, at least one band, of the set of bands, is not associated with a priority of the set of priorities; and the apparatus further includes means for determining a position of the at least one band within the order for scanning the set of bands based at least in part on an energy level. In some aspects, the apparatus includes means for determining the order for scanning the set of bands based at least in part on a set of energy levels of the set of bands. In some aspects, the apparatus includes means for determining the order for scanning the set of bands based at least in part on a set of suitability criteria for the set of bands. In some aspects, the apparatus includes means for reselecting to a cell based at least in part on scanning the set of bands. In some aspects, the cell is an anchor cell. In some aspects, the apparatus includes means for acquiring a cell based at least in part on scanning the set of bands. In some aspects, the cell is acquired based at least in part on an energy level of the cell satisfying a threshold.

In some aspects, the apparatus includes means for determining the threshold based at least in part on: a stored value, a call flow scenario, a coverage metric, a minimum value, a maximum value, a connection event, or an increment value. In some aspects, the apparatus includes means for determining a new order for scanning a subset of the set of bands based at least in part on respective energy levels of the subset of the set of bands. In some aspects, the apparatus includes means for determining the order for scanning the set of bands based at least in part on a set of timestamps of the set of bands. In some aspects, the apparatus includes means for determining a prioritization of a set of acquisition candidates based at least in part on the set of priorities for the set of bands. In some aspects, the apparatus includes means for receiving information identifying the band priority list. In some aspects, the band priority list is dynamically configured based at least in part one or more network measurements. In some aspects, the band priority list is based at least in part on: an ENDC capability, a throughput capability, or a band range capability.

Some aspects described herein relate to a method of wireless communication performed by a UE. The method may include obtaining a band priority list identifying a set of bands in a prioritized order. The method may include performing a system scan of one or more bands of a frequency list that are associated with at least a threshold energy level in the prioritized order of the one or more bands in the band priority list.

Some aspects described herein relate to a user equipment (UE) for wireless communication. The user equipment may include a memory and one or more processors coupled to the memory. The one or more processors may be configured to obtain a band priority list identifying a set of bands in a prioritized order. The one or more processors may be configured to perform a system scan of one or more bands of a frequency list that are associated with at least a threshold energy level in the prioritized order of the one or more bands in the band priority list.

Some aspects described herein relate to a non-transitory computer-readable medium that stores a set of instructions for wireless communication by a user equipment (UE). The set of instructions, when executed by one or more processors of the UE, may cause the UE to obtain a band priority list identifying a set of bands in a prioritized order. The set of instructions, when executed by one or more processors of the UE, may cause the UE to perform a system scan of one or more bands of a frequency list that are associated with at least a threshold energy level in the prioritized order of the one or more bands in the band priority list.

Some aspects described herein relate to an apparatus for wireless communication. The apparatus may include means for obtaining a band priority list identifying a set of bands in a prioritized order. The apparatus may include means for performing a system scan of one or more bands of a frequency list that are associated with at least a threshold energy level in the prioritized order of the one or more bands in the band priority list.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
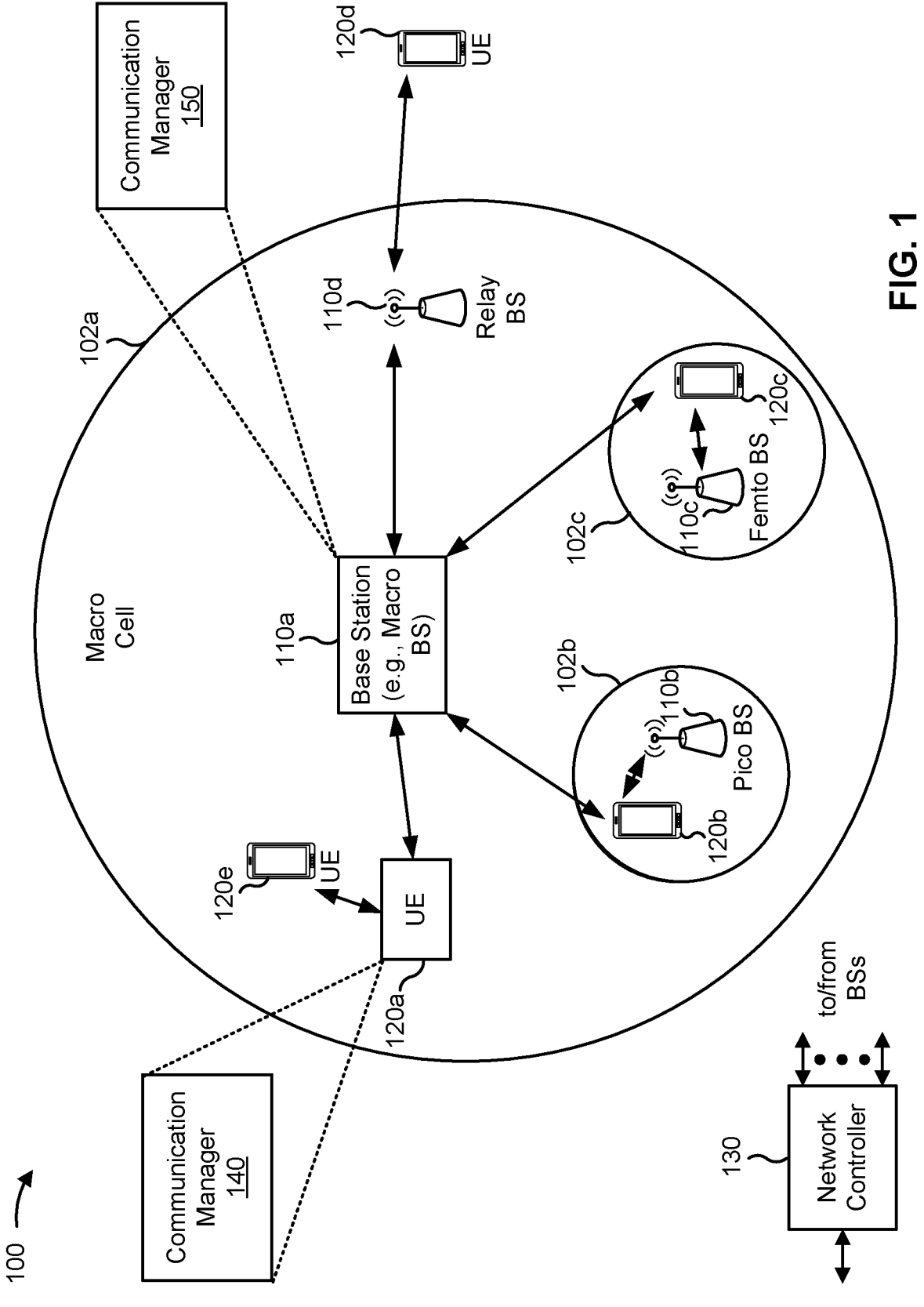
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like. In some aspects, the base station 110 may include a communication manager 150. The communication manager 150 may perform one or more other operations described herein.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine, based at least in part on a set of priorities for a set of bands of a band priority list, an order for scanning the set of bands; and scan the set of bands using the order for scanning the set of bands. The communication manager 140 may obtain a band priority list identifying a set of bands in a prioritized order; and perform a system scan of one or more bands of a frequency list that are associated with at least a threshold energy level in the prioritized order of the one or more bands in the band priority list. The communication manager 140 may obtain a band priority list for a set of bands; and scan the set of bands of the band priority list in a prioritized order associated with a set of priorities for the set of bands and a suitability criterion. Additionally, or alternatively, the communication manager 140 may perform one or more other operations described herein.

As indicated above, FIG. 1 is provided as an example. Other examples may differ from what is described with regard to FIG. 1.

Figure 2:
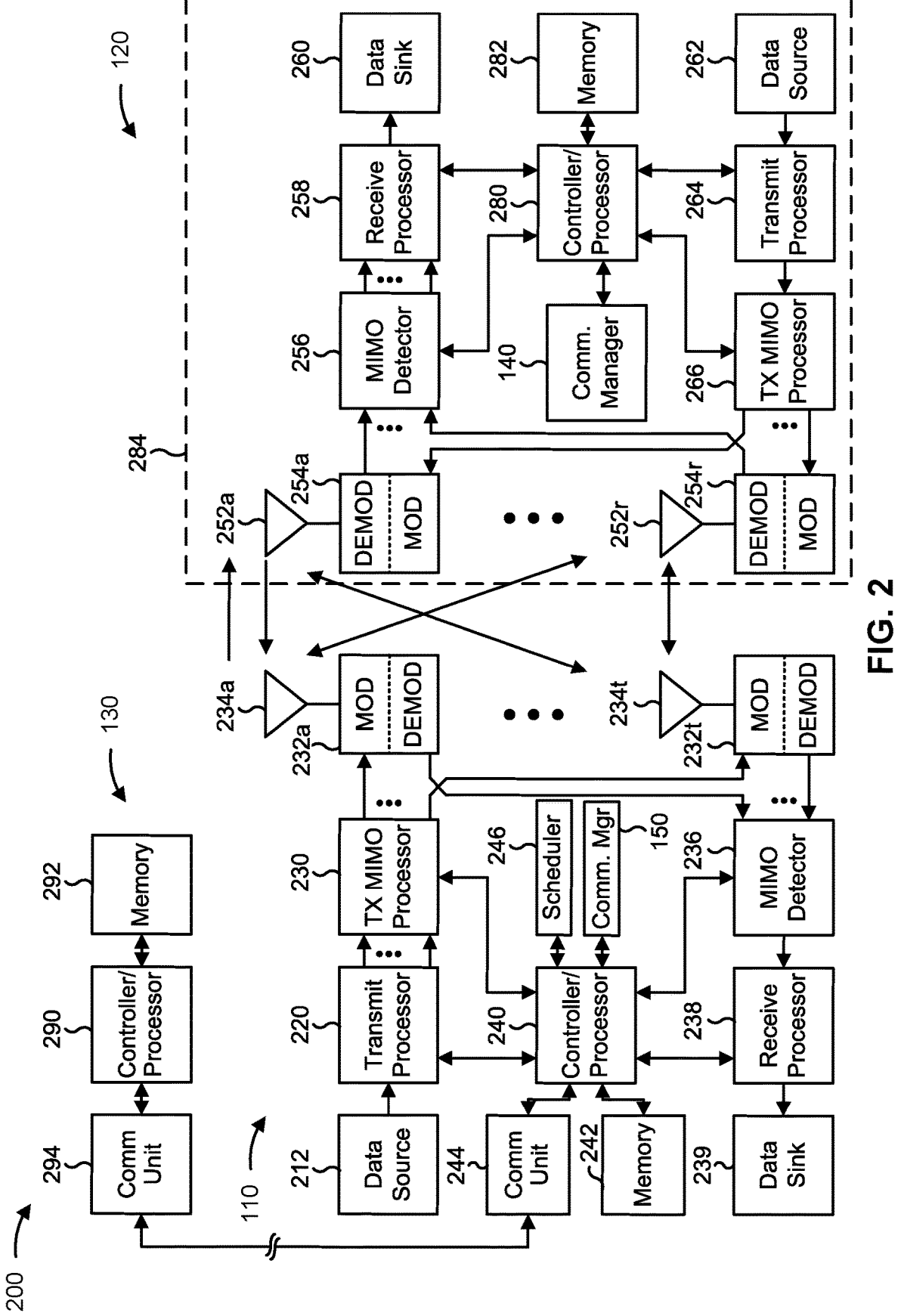
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with the present disclosure. The base station 110 may be equipped with a set of antennas

234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with band priority utilization for cell scanning, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., the UE 120) includes means for determining, based at least in part on a set of priorities for a set of bands of a band priority list, an order for scanning the set of bands; and/or means for scanning the set of bands using the order for scanning the set of bands. In some aspects, the UE includes means for obtaining a band priority list for a set of bands; and/or means for scanning the set of bands of the band priority list in a prioritized order associated with a set of priorities for the set of bands and a suitability criterion. In some aspects, the UE includes means for obtaining a band priority list identifying a set of bands in a prioritized order; and/or means for performing a system scan of one or more bands of a frequency list that are associated with at least a threshold energy level in the prioritized order of the one or more bands in the band priority list. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., the base station 110) may include means for performing one or more other operations described herein. The means for the base station to perform operations described herein may include, for example, one or more of communication manager 150, antenna 234, modem 232, MIMO detector 236, receive processor 238, transmit processor 220, TX MIMO processor 230, controller/processor 240, or memory 242

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
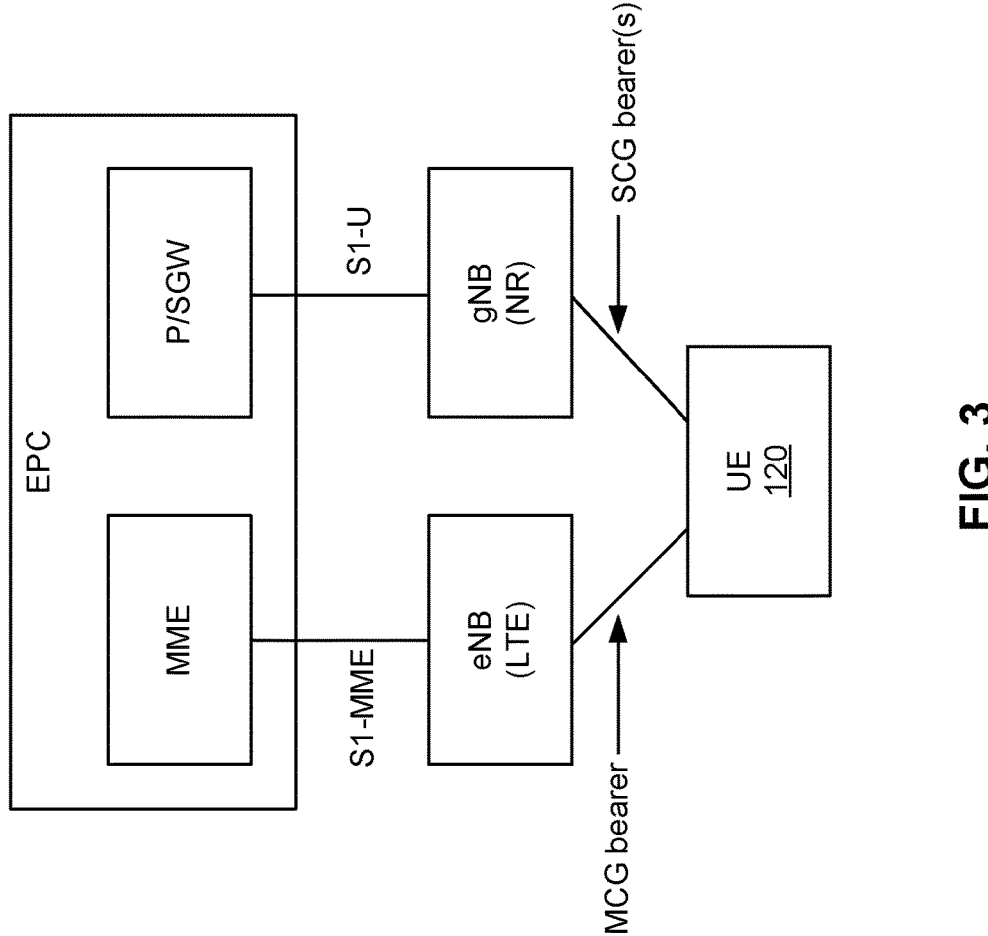
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to operation in connection with an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, a NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MIME), a packet data network gateway (PGW), a serving gateway (SGW), and/or the like. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs), signaling radio bearers (SRBs), and/or the like). For example, the UE 120 may transmit or receive data via the MCG and/or the SCG using one or more DRBs. Similarly, the UE 120 may transmit or receive control information (e.g., radio resource control (RRC) information, measurement reports, and/or the like) using one or more SRBs.

In some aspects, a radio bearer may be dedicated to a specific cell group (e.g., a radio bearer may be an MCG bearer, an SCG bearer, and/or the like). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
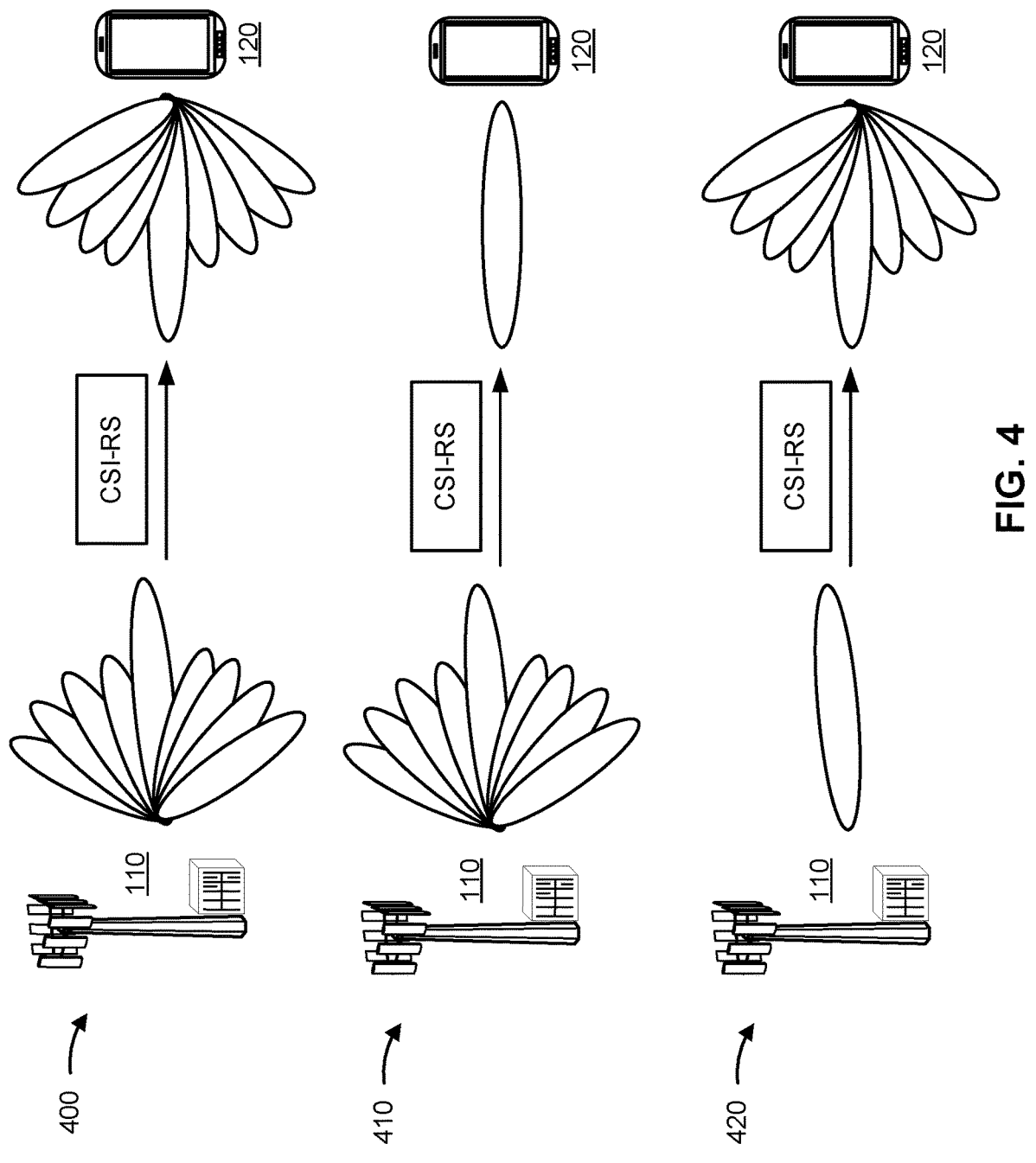
FIG. 4 is a diagram illustrating an example of channel state information reference signal beam management procedures, in accordance with the present disclosure.

FIG. 4 is a diagram illustrating examples 400, 410, and 420 of CSI-RS beam management procedures, in accordance with the present disclosure. As shown in FIG. 4, examples 400, 410, and 420 include a UE 120 in communication with a base station 110 in a wireless network (e.g., wireless network 100). However, the devices shown in FIG. 4 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., an RRC connected state and/or the like).

As shown in FIG. 4, example 400 may include a base station 110 and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 4 and example 400, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 400 has been described in connection with CSI-RSs, the first beam management process may also use synchronization signal blocks (SSBs) for beam management in a similar manner as described above.

As shown in FIG. 4, example 410 may include a base station 110 and a UE 120 communicating to perform beam management using CSI-RSs. Example 410 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 4 and example 410, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 4 and example 420, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 4 is provided as an example of beam management procedures. Other examples of beam management procedures may differ from what is described with respect to FIG. 4. For example, the UE 120 and the base station 110 may perform the third beam management procedure before performing the second beam management procedure, the UE 120 and the base station 110 may perform a similar beam management procedure to select a UE transmit beam, and/or the like.

In some communication systems, a UE may scan a set of bands, which may include a band scan or system scan, to identify beams and/or cells to access for communication services. For example, the UE may identify a beam and/or cell based at least in part on scanning the set of bands, and may camp onto the beam and/or cell. When performing the scan of the set of bands, the UE may perform a two-pass scan, a one-pass scan, and/or the like. In a two-pass scan, the UE performs a system scan on all available priority bands without absolute priority-based reordering and, if no cell is identified that is suitable for camping, the UE may perform a band scan on priority bands using a band priority list (BPL). In a one-pass scan, the UE may perform a system scan and prioritize bands based at least in part on a result of the system scan.

Thus, in both the two-pass scan and the one-pass scan, all bands of the BPL are treated with the same priority during a list frequency scan and subsequently prioritized based at least in part on energy levels. In other words, although the UE may have access to a BPL and may prioritize according to the BPL for a band scan, the UE does not use the BPL for a system scan and an associated camping decision. For example, the UE may prioritize a band with a higher energy level over a band with a lower energy level regardless of respective priorities in the BPL. This may ensure that the UE camps onto a beam and/or cell with a threshold energy level that enables communication with, for example, a BS.

However, in some cases, it may be desirable for the UE to camp onto a particular cell as an anchor cell even when the particular cell does not have a highest energy level determined when performing a list frequency scan. For example, a particular cell may have a particular capability, such as NR handling, or a particular subset of bands that an operator of the UE may want the UE to use. In contrast, when the UE follows the list frequency scan, the UE may camp onto, for example, an LTE cell that lacks ENDC capability, which may result in lower performance than camping onto an NR cell with ENDC capability.

Some aspects described herein enable band priority utilization for band scanning, such as for system scanning. For example, a UE may prioritize one or more bands based at least in part on absolute priority levels in the BPL, and may perform a band scan, such a system scan, based at least in part on prioritizing the one or more bands. In this case, based at least in part on performing the system scan, the UE may select a band based at least in part on prioritizing the one or more bands, satisfaction of a suitability criterion (S-criterion), detection of a threshold energy level, and/or the like. In this way, the UE may ensure that, when a reselection occurs, the UE selects an anchor cell that has, for example, a desired capability. Furthermore, the UE improves communication performance relative to selecting any available cell identified from a list frequency scan.

Figure 5:
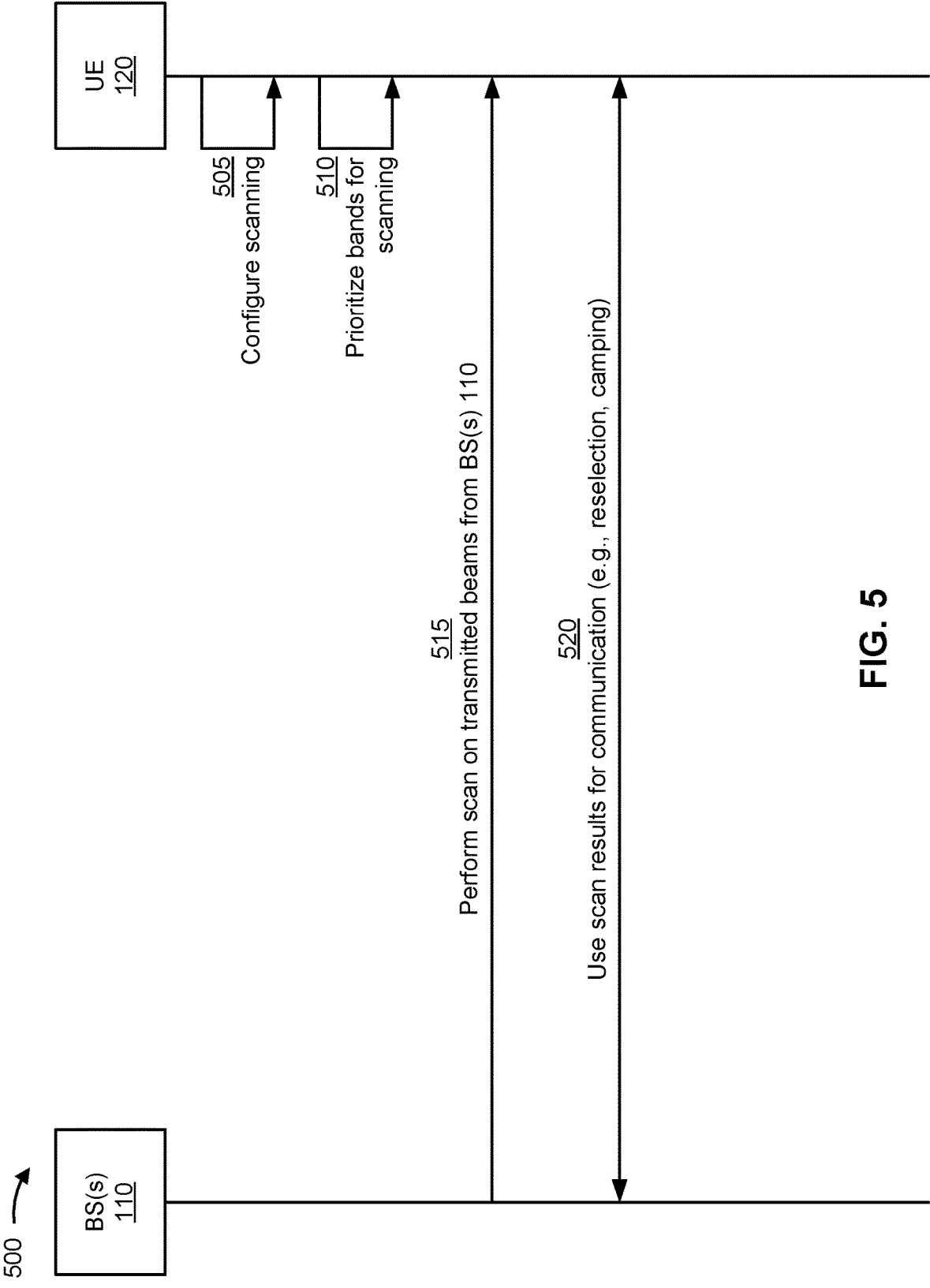
FIG. 5 is a diagram illustrating an example associated with band priority utilization for cell scanning, in accordance with the present disclosure.

FIG. 5 is a diagram illustrating an example 500 associated with band priority utilization for cell scanning, in accordance with the present disclosure. As shown in FIG. 5, a base station 110 and a UE 120 may communicate with one another.

As further shown in FIG. 5, and by reference number 505, UE 120 may configure scanning. For example, UE 120 may obtain a BPL. In some aspects, UE 120 may obtain the BPL from a memory. For example, UE 120 may be configured with a static BPL provided by an original equipment manufacturer, a network service provider, and/or the like. Additionally, or alternatively, UE 120 may dynamically determine the BPL. For example, UE 120 may dynamically reconfigure the BPL based at least in part on network data, network measurements, and/or the like. Additionally, or alternatively, base station 110 or a network device associated therewith may dynamically reconfigure the BPL and provide the dynamically reconfigured BPL to UE 120, such as using radio resource control (RRC) signaling, medium access control (MAC) control element (CE) signaling, downlink control information (DCI) signaling, and/or the like. For example, a network device may obtain network data and use artificial intelligence, a neural network, or other suitable data processing techniques to configure or reconfigure the BPL. In some aspects, the BPL is ordered based at least in part on a set of network characteristics. For example, the BPL may be ordered based at least in part on an ENDC capability of a set of bands, a throughput capability of the set of bands, a band range of the set of bands, a performance history of one or more UEs operating on the set of bands, and/or the like.

Additionally, or alternatively, UE 120 may configure a threshold for the band scan. For example, UE 120 may obtain an energy threshold, to use when determining whether to select a band as a result of the band scan as described in more detail herein, from memory based at least in part on a static configuration. Additionally, or alternatively, UE 120 may dynamically determine the energy threshold. For example, UE 120 may use dynamic self-learning to adjust the energy threshold based at least in part on call flow scenarios (e.g., whether calls are being dropped), coverage metrics, and/or the like. In this case, UE 120 may be configured with a minimum threshold, a maximum threshold, a step size, and/or the like, and the UE 120 may increment or decrement the energy threshold (between the minimum threshold and the maximum threshold and by the step size) based at least in part on detection of an event. For example, when UE 120 detects a radio link failure (RLF), a random access channel (RACH) failure, and/or the like, UE 120 may adjust the energy threshold. In some aspects, UE 120 may adjust the energy threshold according to a time step. For example, UE 120 may evaluate the aforementioned events on a time step basis (e.g., evaluated on the order of once every several seconds, once every several milliseconds, and/or the like). In this way, UE 120 ensures efficient camping based at least in part on identifying a best available band. Although some aspects describe determining the threshold in terms of a UE operation, the determination may be performed and signaled to the UE by another device, such as another UE, a BS, a network device, and/or the like.

As further shown in FIG. 5, and by reference number 510, UE 120 may prioritize bands for scanning. For example, UE 120 may prioritize bands based at least in part on the BPL for a system scan, a band scan, and/or the like. In some aspects, UE 120 may bias one or more bands based at least in part on the BPL. For example, UE 120 may bias a particular band toward selection based at least in part on the particular band having a particular priority in the BPL, a threshold energy level, satisfaction of an S-criterion, and/or the like. The S-criterion may relate to whether a band has a threshold energy level, a threshold level of congestion, a threshold RSRP, a threshold RSRQ, a threshold signal to interference and noise ratio (SINR), or a threshold block error rate (BLER), among other examples. In some aspects, UE 120 may select a subset of a set of bands in the BPL. For example, UE 120 may identify 20 band candidates and select a first 10 band candidates based at least in part on time stamps associated with the first 10 band candidates for a list frequency scan. In this case, when performing the system scan, UE 120 may prioritize acquisition candidates based at least in part on priority band order in the BPL.

As further shown in FIG. 5, and by reference numbers 515 and 520, UE 120 may perform a scan and use scan results for communication. For example, UE 120 may monitor beams transmitted from one or more BSs 110 to perform a system scan, a band scan, and/or the like to enable a reselection, camping, and/or the like. In some aspects, UE 120 may perform system scanning using a prioritization from the BPL. As an example, in an RLF case, UE 120 may strictly align prioritization of bands with the BPL and perform cell acquisition on a band with a threshold energy level. In this case, UE 120 may reorder other bands, not included in the BPL, based at least in part on a legacy ordering technique, such as based at least in part on energy level. As another example, in a power-on or out-of-service case, UE 120 may complete a priority band scan path procedure by strictly aligning prioritization of bands for acquisition on a band with a threshold energy level (and using energy level based prioritization for any candidate bands that are not included in the BPL). As another example, UE 120 may perform the scan and communicate with a base station 110 in accordance with an edge and fog computing system (EFS).

As a particular example, UE 120 may have a frequency list with a first frequency F1 (e.g., band: 12, energy: −109 decibels (dB)), a second frequency F2 (e.g., band: 2, energy: −118 dB), and a third frequency F3 (e.g., band: 30, energy: −118 dB). In a band priority list, band 2 may have a higher priority than band 12 and band 30. In a system scan, UE 120 may determine an order for scanning a frequency list as F2 first, F1 second, as F2 (band 2) is associated with a higher priority than F1 (band 12). In this case, even though F1 has a higher energy (−109 dB) than F2 (−118 dB, which, in this example is lower but still satisfies an S-criteria), UE 120 biases toward scanning F2 first and selecting F2 for camping, over scanning F1 and camping onto F1.

As indicated above, FIG. 5 is provided as an example. Other examples may differ from what is described with respect to FIG. 5.

Figure 6:
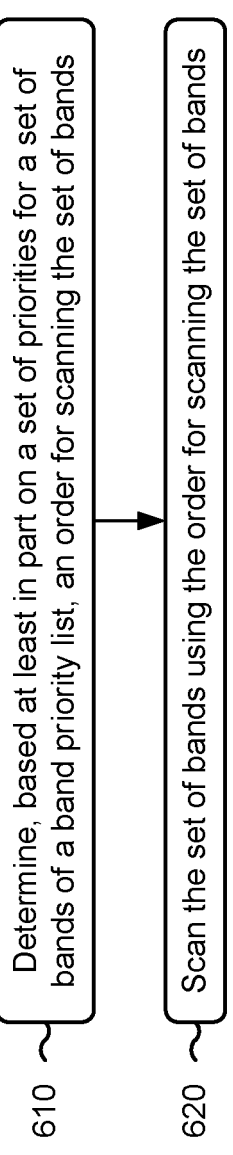
FIG. 6 is a diagram illustrating an example process associated with band priority utilization for cell scanning, in accordance with the present disclosure.

FIG. 6 is a diagram illustrating an example process 600 performed, for example, by a UE, in accordance with the present disclosure. Example process 600 is an example where the UE (e.g., UE 120) performs operations associated with band priority utilization for cell scanning.

As shown in FIG. 6, in some aspects, process 600 may include determining, based at least in part on a set of priorities for a set of bands of a band priority list, an order for scanning the set of bands (block 610). For example, the UE (e.g., using determination component 708) may determine, based at least in part on a set of priorities for a set of bands of a band priority list, an order for scanning the set of bands, as described above.

As further shown in FIG. 6, in some aspects, process 600 may include scanning the set of bands using the order for scanning the set of bands (block 620). For example, the UE (e.g., using scanning component 710) may scan the set of bands using the order for scanning the set of bands, as described above.

Process 600 may include additional aspects, such as any single aspect or any combination of aspects described below and/or in connection with one or more other processes described elsewhere herein.

In a first aspect, scanning the set of bands comprises at least one of a band scan or a system scan.

In a second aspect, alone or in combination with the first aspect, at least one band, of the set of bands, is not associated with a priority of the set of priorities, and the determination of the order for scanning the set of bands comprises determining a position of the at least one band within the order for scanning the set of bands based at least in part on an energy level.

In a third aspect, alone or in combination with one or more of the first and second aspects, the determination of the order for scanning the set of bands comprises determining the order for scanning the set of bands based at least in part on a set of energy levels of the set of bands.

In a fourth aspect, alone or in combination with one or more of the first through third aspects, the determination of the order for scanning the set of bands comprises determining the order for scanning the set of bands based at least in part on a set of suitability criteria for the set of bands.

In a fifth aspect, alone or in combination with one or more of the first through fourth aspects, process 600 includes reselecting to a cell based at least in part on scanning the set of bands.

In a sixth aspect, alone or in combination with one or more of the first through fifth aspects, the cell is an anchor cell.

In a seventh aspect, alone or in combination with one or more of the first through sixth aspects, process 600 includes acquiring a cell based at least in part on scanning the set of bands.

In an eighth aspect, alone or in combination with one or more of the first through seventh aspects, the cell is acquired based at least in part on an energy level of the cell satisfying a threshold.

In a ninth aspect, alone or in combination with one or more of the first through eighth aspects, process 600 includes determining the threshold based at least in part on a stored value, a call flow scenario, a coverage metric, a minimum value, a maximum value, a connection event, or an increment value.

In a tenth aspect, alone or in combination with one or more of the first through ninth aspects, process 600 includes determining a new order for scanning a subset of the set of bands based at least in part on respective energy levels of the subset of the set of bands.

In an eleventh aspect, alone or in combination with one or more of the first through tenth aspects, the determination of the order for scanning the set of bands comprises determining the order for scanning the set of bands based at least in part on a set of timestamps of the set of bands.

In a twelfth aspect, alone or in combination with one or more of the first through eleventh aspects, the determination of the order for scanning the set of bands comprises determining a prioritization of a set of acquisition candidates based at least in part on the set of priorities for the set of bands.

In a thirteenth aspect, alone or in combination with one or more of the first through twelfth aspects, process 600 includes receiving information identifying the band priority list.

In a fourteenth aspect, alone or in combination with one or more of the first through thirteenth aspects, the band priority list is dynamically configured based at least in part one or more network measurements.

In a fifteenth aspect, alone or in combination with one or more of the first through fourteenth aspects, the band priority list is based at least in part on an ENDC capability, a throughput capability, or a band range capability.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
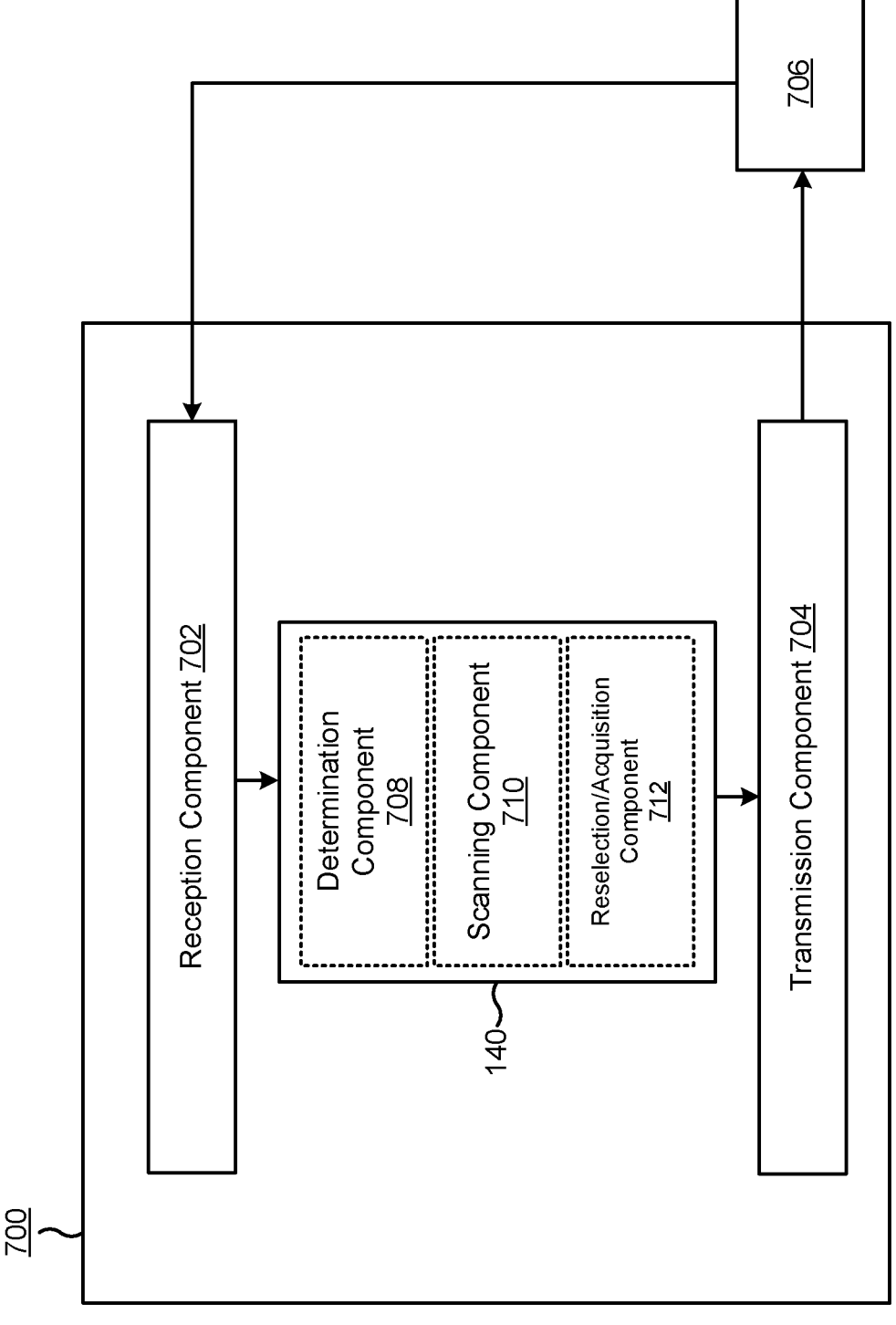
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708, a scanning component 710, or a reselection/acquisition component 712, among other examples.

In some aspects, the apparatus 700 may be configured to perform one or more operations described herein in connection with FIG. 5. Additionally or alternatively, the apparatus 700 may be configured to perform one or more processes described herein, such as process 600 of FIG. 6, process 900 of FIG. 9, process 1000 of FIG. 10, and/or the like. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2. In some aspects, the reception component 702 may receive information identifying a band priority list. In some aspects, the reception component 702 may receive beams and/or signals associated with scanning one or more bands.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may transmit one or more beams and/or signals associated with scanning a set of bands and/or acquiring or camping onto a cell. In some aspects, the transmission component 704 may be co-located with the reception component 702 in a transceiver.

The determination component 708 may determine, based at least in part on a set of priorities for a set of bands of a band priority list, an order for scanning the set of bands. The determination component 708 may obtain a band priority list for a set of bands. In some aspects, the determination component 708 may include one or more of a receive processor, a transmit processor, a controller/processor, a memory, or a combination thereof, of the UE described above in connection with FIG. 2. The determination component 708 may determine the threshold based at least in part on a stored value, a call flow scenario, a coverage metric, a minimum value, a maximum value, a connection event, or an increment value. The determination component 708 may determine a new order for scanning a subset of the set of bands based at least in part on respective energy levels of the subset of the set of bands.

The scanning component 710 may scan the set of bands using the order for scanning the set of bands. In some aspects, the scanning component 710 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The reselection/acquisition component 712 may reselect to a cell based at least in part on scanning the set of bands. In some aspects, the reselection/acquisition component 712 may include one or more antennas, a demodulator, a MIMO detector, a receive processor, a modulator, a transmit MIMO processor, a transmit processor, a controller/processor, a memory, or a combination thereof, of the UE described above in connection with FIG. 2. In some aspects, the reselection/acquisition component 712 may acquire a cell based at least in part on scanning the set of bands.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
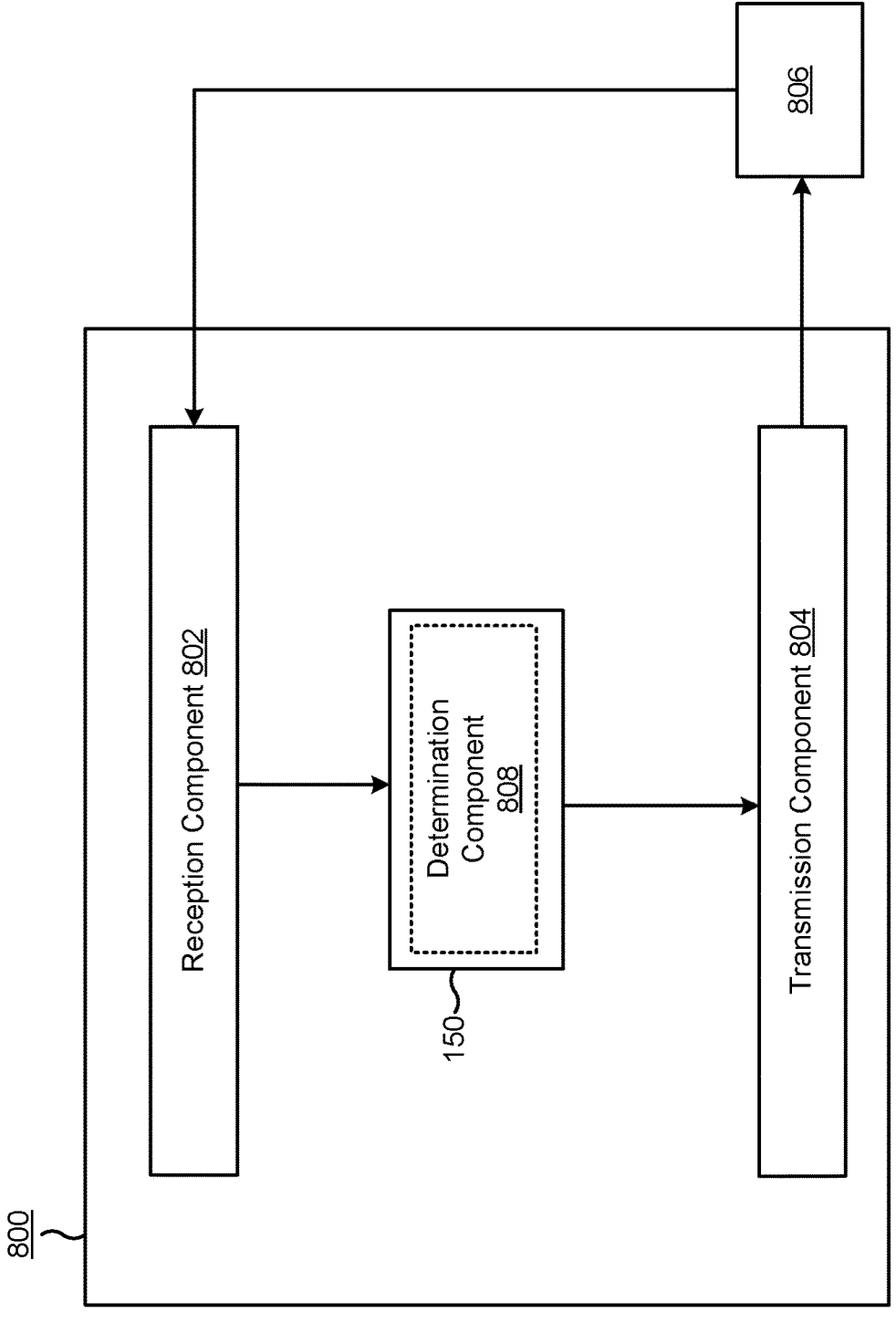

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808 among other examples.

In some aspects, the apparatus 800 may be configured to perform one or more operations described. Additionally or alternatively, the apparatus 800 may be configured to perform one or more processes described herein. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be co-located with the reception component 802 in a transceiver.

The determination component 808 may determine a band priority list, an energy threshold, and/or the like. For example, the determination component 808 may dynamically determine the band priority list or energy threshold and the transmission component 804 may transmit information identifying the band priority list or the energy threshold to the apparatus 806. In some aspects, the determination component 808 may include a receive processor, a transmit processor, a controller/processor, a memory, or a combination thereof, of the BS described above in connection with FIG. 2.

The reception component 802 may obtain a band priority list identifying a set of bands in a prioritized order. The reception component 802 may perform a system scan of one or more bands of a frequency list that are associated with at least a threshold energy level in the prioritized order of the one or more bands in the band priority list.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
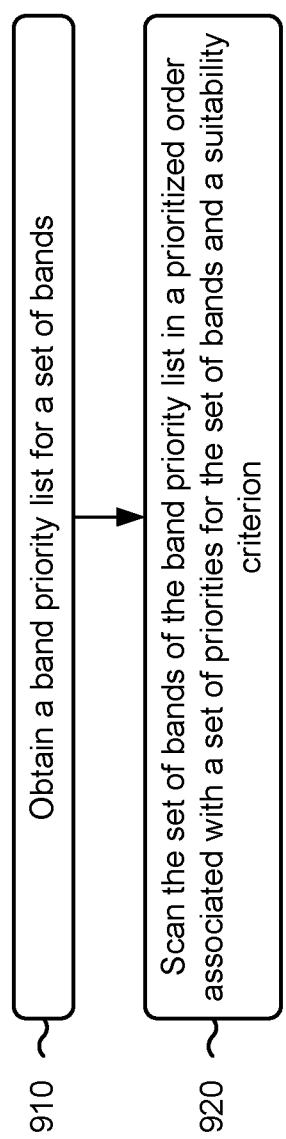
FIGS. 9-10 are diagrams illustrating example processes associated with band priority utilization for cell scanning, in accordance with the present disclosure.

FIG. 9 is a diagram illustrating an example process 900 performed, for example, by a UE, in accordance with the present disclosure. Example process 900 is an example where the UE (e.g., the communication manager 140 and/or the UE 120) performs operations associated with band priority utilization for cell scanning.

As shown in FIG. 9, in some aspects, process 900 may include obtaining a band priority list for a set of bands (block 910). For example, the UE (e.g., using communication manager 140 and/or scanning component 710, depicted in FIG. 7) may obtain a band priority list for a set of bands, as described above.

As further shown in FIG. 9, in some aspects, process 900 may include scanning the set of bands of the band priority list in a prioritized order associated with a set of priorities for the set of bands and a suitability criterion (block 920). For example, the UE (e.g., using communication manager 140 and/or reception component 702, depicted in FIG. 8) may scan the set of bands of the band priority list in a prioritized order associated with a set of priorities for the set of bands and a suitability criterion, as described above.

Process 900 may include additional aspects, such as any single aspect or any combination of aspects described below and/or in connection with one or more other processes described elsewhere herein.

In a first aspect, the band priority list includes a frequency list.

In a second aspect, the frequency list is based at least in part on at least one of an acquisition data set, an inter-radio access technology data set, an inter-frequency data set, a configured data set, or a visited cell data set.

In a third aspect, scanning the set of bands comprises at least one of a band scan or a system scan.

In a fourth aspect, process 900 includes determining a position of at least one band within the prioritized order for scanning the set of bands based at least in part on an energy level of the at least one band.

In a fifth aspect, the scanning the set of bands is a system scan that is to occur before a band scan of the band priority list.

In a sixth aspect, at least one band, of the set of bands, is not associated with a priority of the set of priorities, and the determination of the order for scanning the set of bands comprises determining a position of the at least one band within the order for scanning the set of bands based at least in part on an energy level.

In a seventh aspect, process 900 includes determining the order for scanning the set of bands based at least in part on a set of energy levels of the set of bands.

In an eighth aspect, process 900 includes determining the order for scanning the set of bands based at least in part on a set of suitability criteria for the set of bands.

In a ninth aspect, process 900 includes reselecting to a cell based at least in part on scanning the set of bands.

In a tenth aspect, the cell is an anchor cell.

In an eleventh aspect, process 900 includes acquiring a cell based at least in part on scanning the set of bands.

In a twelfth aspect, the cell is acquired based at least in part on an energy level of the cell satisfying a threshold.

In a thirteenth aspect, process 900 includes determining the threshold based at least in part on a stored value, a call flow scenario, a coverage metric, a minimum value, a maximum value, a connection event, or an increment value.

In a fourteenth aspect, process 900 includes determining a new order for scanning a subset of the set of bands based at least in part on respective energy levels of the subset of the set of bands.

In a fifteenth aspect, process 900 includes determining the order for scanning the set of bands based at least in part on a set of timestamps of the set of bands.

In a sixteenth aspect, process 900 includes determining a prioritization of a set of acquisition candidates based at least in part on the set of priorities for the set of bands.

In a seventeenth aspect, process 900 includes receiving information identifying the band priority list.

In an eighteenth aspect, the band priority list is dynamically configured based at least in part one or more network measurements.

In a nineteenth aspect, the band priority list is based at least in part on an evolved universal terrestrial radio access (E-UTRA) New Radio Dual Connectivity (ENDC) capability, a throughput capability, or a band range capability.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
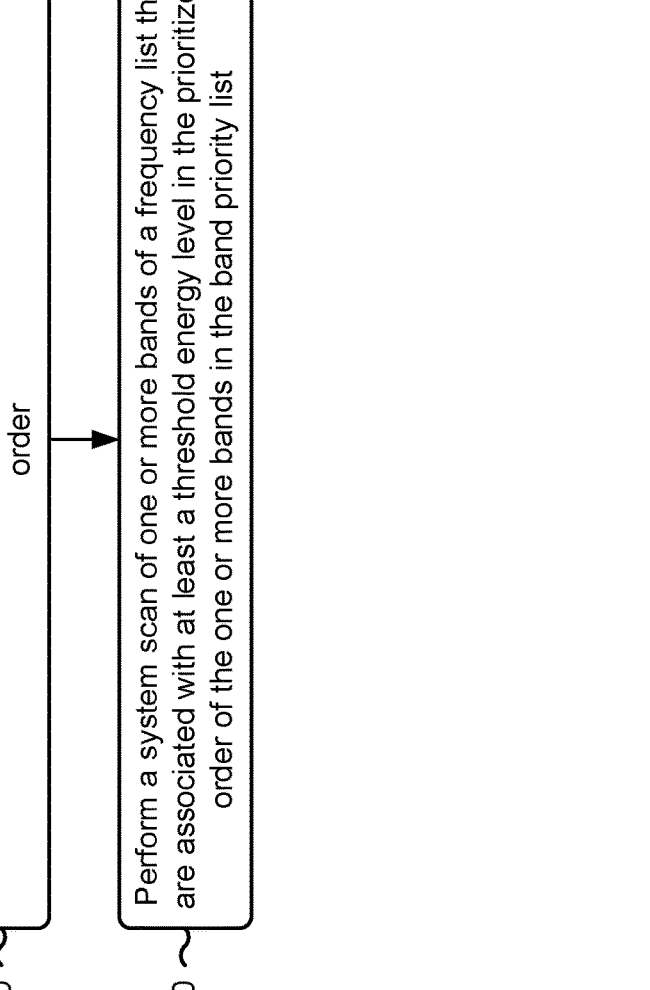

FIG. 10 is a diagram illustrating an example process 1000 performed, for example, by a UE, in accordance with the present disclosure. Example process 1000 is an example where the UE (e.g., UE 120) performs operations associated with band priority utilization for cell scanning.

As shown in FIG. 10, in some aspects, process 1000 may include obtaining a band priority list identifying a set of bands in a prioritized order (block 1010). For example, the UE (e.g., using communication manager 140 and/or reception component 902, depicted in FIG. 9) may obtain a band priority list identifying a set of bands in a prioritized order, as described above.

As further shown in FIG. 10, in some aspects, process 1000 may include performing a system scan of one or more bands of a frequency list that are associated with at least a threshold energy level in the prioritized order of the one or more bands in the band priority list (block 1020). For example, the UE (e.g., using communication manager 140 and/or reception component 902, depicted in FIG. 9) may perform a system scan of one or more bands of a frequency list that are associated with at least a threshold energy level in the prioritized order of the one or more bands in the band priority list, as described above.

Process 1000 may include additional aspects, such as any single aspect or any combination of aspects described below and/or in connection with one or more other processes described elsewhere herein.

In a first aspect, the frequency list is based at least in part on at least one of an acquisition data set, an inter-radio access technology data set, an inter-frequency data set, a configured data set, or a visited cell data set.

In a second aspect, the band priority list is based at least in part on a UE-supported band location-specific data set or a UE radio frequency supported band data set In a third aspect, the system scan is configured to occur before a band scan of the set of bands of the band priority list.

In a fourth aspect, at least one band, of the one or more bands, is associated with a priority in the prioritized order, and further comprising determining a position of the at least one band within the prioritized order for scanning the set of bands based at least in part on an energy level of the at least one band.

In a fifth aspect, process 1000 includes determining the threshold energy level is a suitability (S) criterion.

In a sixth aspect, process 1000 includes reselecting to a cell based at least in part on performing the system scan.

In a seventh aspect, the cell is an anchor cell.

In an eighth aspect, process 1000 includes acquiring a cell based at least in part on performing the system scan.

In a ninth aspect, the cell is acquired based at least in part on an energy level of the cell satisfying the threshold energy level.

In a tenth aspect, process 1000 includes determining the threshold energy level based at least in part on a stored value, a call flow scenario, a coverage metric, a minimum value, a maximum value, a connection event, or an increment value.

In an eleventh aspect, process 1000 includes determining a new order for scanning a subset of the set of bands based at least in part on respective energy levels of the subset of the set of bands.

In a twelfth aspect, process 1000 includes determining the prioritized order for based at least in part on a set of timestamps of the set of bands.

In a thirteenth aspect, process 1000 includes determining a prioritization of a set of acquisition candidates based at least in part on a set of priorities for the set of bands in the band priority list.

In a fourteenth aspect, the band priority list is dynamically configured based at least in part one or more network measurements.

In a fifteenth aspect, the band priority list is based at least in part on an E-UTRA New Radio Dual Connectivity (ENDC) capability, a throughput capability, or a band range capability.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: obtaining a band priority list identifying a set of bands in a prioritized order; performing a system scan of one or more bands of a frequency list that are associated with at least a threshold energy level in the prioritized order of the one or more bands in the band priority list.

Aspect 2: The method of Aspect 1, wherein the frequency list is based at least in part on at least one of: an acquisition data set, an inter-radio access technology data set, an inter-frequency data set, a configured data set, or a visited cell data set.

Aspect 3: The method of any of Aspects 1 to 2, wherein the band priority list is based at least in part on a UE-supported band location-specific data set or a UE radio frequency supported band data set Aspect 4: The method of any of Aspects 1 to 3, wherein the system scan is configured to occur before a band scan of the set of bands of the band priority list.

Aspect 5: The method of any of Aspects 1 to 4, wherein at least one band, of the one or more bands, is associated with a priority in the prioritized order; and further comprising: determining a position of the at least one band within the prioritized order for scanning the set of bands based at least in part on an energy level of the at least one band.

Aspect 6: The method of any of Aspects 1 to 5, further comprising: determining the threshold energy level is a suitability (S) criterion.

Aspect 7: The method of any of Aspects 1 to 6, further comprising: reselecting to a cell based at least in part on performing the system scan.

Aspect 8: The method of Aspect 7, wherein the cell is an anchor cell.

Aspect 9: The method of any of Aspects 1 to 8, further comprising: acquiring a cell based at least in part on performing the system scan.

Aspect 10: The method of Aspect 9, wherein the cell is acquired based at least in part on an energy level of the cell satisfying the threshold energy level.

Aspect 11: The method of Aspect 10, further comprising: determining the threshold energy level based at least in part on: a stored value, a call flow scenario, a coverage metric, a minimum value, a maximum value, a connection event, or an increment value.

Aspect 12: The method of any of Aspects 1 to 11, further comprising: determining a new order for scanning a subset of the set of bands based at least in part on respective energy levels of the subset of the set of bands.

Aspect 13: The method of any of Aspects 1 to 12, further comprising: determining the prioritized order for based at least in part on a set of timestamps of the set of bands.

Aspect 14: The method of any of Aspects 1 to 13, further comprising: determining a prioritization of a set of acquisition candidates based at least in part on a set of priorities for the set of bands in the band priority list.

Aspect 15: The method of any of Aspects 1 to 14, wherein the band priority list is dynamically configured based at least in part one or more network measurements.

Aspect 16: The method of any of Aspects 1 to 15, wherein the band priority list is based at least in part on: an E-UTRA New Radio Dual Connectivity (ENDC) capability, a throughput capability, or a band range capability.

Aspect 17: An apparatus for wireless communication at a device, comprising a processor; memory coupled with the processor; and instructions stored in the memory and executable by the processor to cause the apparatus to perform the method of one or more of Aspects 1-16.

Aspect 18: A device for wireless communication, comprising a memory and one or more processors coupled to the memory, the one or more processors configured to perform the method of one or more of Aspects 1-16.

Aspect 19: An apparatus for wireless communication, comprising at least one means for performing the method of one or more of Aspects 1-16.

Aspect 20: A non-transitory computer-readable medium storing code for wireless communication, the code comprising instructions executable by a processor to perform the method of one or more of Aspects 1-16.

Aspect 21: A non-transitory computer-readable medium storing a set of instructions for wireless communication, the set of instructions comprising one or more instructions that, when executed by one or more processors of a device, cause the device to perform the method of one or more of Aspects 1-16.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   determining, for a set of bands of a band priority list, an order for scanning the set of bands based at least in part on each band of the set of bands satisfying a criterion;
   scanning the set of bands using the order for scanning the set of bands;
   detecting a radio link failure;
   adjusting an energy threshold based at least in part on detecting the radio link failure; and
   acquiring a cell based at least in part on scanning the set of bands and based at least in part on an energy level of the cell satisfying the energy threshold.

2. The method of claim 1,
   wherein scanning the set of bands comprises performing at least one of a band scan or a system scan.

3. The method of claim 1,
   wherein at least one band, of the set of bands, is not associated with a priority; and
   wherein the determination of the order for scanning the set of bands comprises:
      determining a position of the at least one band within the order for scanning the set of bands based at least in part on an energy level.

4. The method of claim 1,
   wherein the determination of the order for scanning the set of bands comprises:
      determining the order for scanning the set of bands based at least in part on a set of energy levels of the set of bands.

5. The method of claim 1, further comprising:
   reselecting to a cell based at least in part on scanning the set of bands.

33

6. The method of claim 5,
wherein the cell is an anchor cell.

7. The method of claim 1, further comprising:
determining the energy threshold based at least in part on:
  a stored value,
  a call flow scenario,
  a coverage metric,
  a minimum value,
  a maximum value,
  a connection event, or
  an increment value.

8. The method of claim 1, further comprising:
determining a new order for scanning a subset of the set of bands based at least in part on respective energy levels of the subset of the set of bands.

9. The method of claim 1,
wherein the determination of the order for scanning the set of bands comprises:
  determining the order for scanning the set of bands based at least in part on a set of timestamps of the set of bands.

10. The method of claim 1,
wherein the determination of the order for scanning the set of bands comprises:
  determining a prioritization of a set of acquisition candidates based at least in part on a set of absolute priority levels for the set of bands.

11. The method of claim 1, further comprising:
receiving information identifying the band priority list.

12. The method of claim 1,
wherein the band priority list is dynamically configured based at least in part one or more network measurements.

13. The method of claim 1,
wherein the band priority list is based at least in part on:
  an E-UTRA New Radio Dual Connectivity (ENDC) capability,
  a throughput capability, or
  a band range capability.

14. The method of claim 1,
wherein the criterion corresponds to a threshold energy level, a threshold level of congestion, a threshold reference signal received power (RSRP), a threshold reference signal received quality (RSRQ), a threshold signal to interference and noise ratio (SINR), or a threshold block error rate (BLER).

15. A user equipment (UE) for wireless communication, comprising:
a memory; and
one or more processors operatively coupled to the memory, the memory and the one or more processors configured to:
  determine, for a set of bands of a band priority list, an order for scanning the set of bands based at least in part on each band of the set of bands satisfying a criterion;
  scan the set of bands using the order for scanning the set of bands;
  detect a radio link failure;
  adjust an energy threshold based at least in part on detecting the radio link failure; and
  acquire a cell based at least in part on scanning the set of bands and based at least in part on an energy level of the cell satisfying the energy threshold.

34

16. The UE of claim 15,
wherein the one or more processors, when scanning the set of bands, are configured to perform a band scan or a system scan.

17. The UE of claim 15,
wherein at least one band, of the set of bands, is not associated with a priority; and
wherein the determination of the order for scanning the set of bands comprises:
  determine a position of the at least one band within the order for scanning the set of bands based at least in part on an energy level.

18. The UE of claim 15,
wherein the determination of the order for scanning the set of bands comprises:
  determine the order for scanning the set of bands based at least in part on a set of energy levels of the set of bands.

19. The UE of claim 15,
wherein the one or more processors are further configured to:
  reselect to a cell based at least in part on scanning the set of bands.

20. The UE of claim 19,
wherein the cell is an anchor cell.

21. The UE of claim 15,
wherein the one or more processors are further configured to:
  determine the energy threshold based at least in part on:
    a stored value,
    a call flow scenario,
    a coverage metric,
    a minimum value,
    a maximum value,
    a connection event, or
    an increment value.

22. The UE of claim 15,
wherein the one or more processors are further configured to:
  determine a new order for scanning a subset of the set of bands based at least in part on respective energy levels of the subset of the set of bands.

23. The UE of claim 15,
wherein the determination of the order for scanning the set of bands comprises:
  determine the order for scanning the set of bands based at least in part on a set of timestamps of the set of bands.

24. The UE of claim 15,
wherein the determination of the order for scanning the set of bands comprises:
  determine a prioritization of a set of acquisition candidates based at least in part on a set of absolute priority levels for the set of bands.

25. The UE of claim 15,
wherein the one or more processors are further configured to:
  receive information identifying the band priority list.

26. The UE of claim 15,
wherein the band priority list is dynamically configured based at least in part one or more network measurements.

27. The UE of claim 15,
wherein the band priority list is based at least in part on:
  an New Radio Dual Connectivity (ENDC) capability, or
  a band range capability.

28. The UE of claim 15, wherein the criterion corresponds to a threshold energy level, a threshold level of congestion, a threshold reference signal received power (RSRP), a threshold reference signal received quality (RSRQ), a threshold signal to interference and noise ratio (SINR), or a threshold block error rate (BLER).

29. A non-transitory computer-readable medium storing a set of instructions for wireless communication, the set of instructions comprising:

one or more instructions that, when executed by one or more processors of a user equipment (UE), cause the UE to:

determine, for a set of bands of a band priority list, an order for scanning the set of bands based at least in part on each band of the set of bands satisfying a criterion;

scan the set of bands using the order for scanning the set of bands;

detect a radio link failure;

adjust an energy threshold based at least in part on detecting the radio link failure; and acquire a cell based at least in part on scanning the set of bands and based at least in part on an energy level of the cell satisfying the energy threshold.

30. The non-transitory computer-readable medium of claim 29, wherein the one or more instructions, that cause the UE to scan the set of bands, cause the UE to perform a band scan or a system scan.

31. The non-transitory computer-readable medium of claim 29, wherein at least one band, of the set of bands, is not associated with a priority; and wherein the one or more instructions, to cause the UE to determine the order for scanning the set of bands, cause the UE to:

determine a position of the at least one band within the order for scanning the set of bands based at least in part on an energy level.

32. The non-transitory computer-readable medium of claim 29, wherein the one or more instructions, to cause the UE to determine the order for scanning the set of bands, cause the UE to:

determine the order for scanning the set of bands based at least in part on a set of energy levels of the set of bands.

33. The non-transitory computer-readable medium of claim 29, wherein the one or more instructions cause the UE to:

reselect to a cell based at least in part on scanning the set of bands.

34. The non-transitory computer-readable medium of claim 33, wherein the cell is an anchor cell.

35. An apparatus for wireless communication, comprising:

means for determining, for a set of bands of a band priority list, an order for scanning the set of bands based at least in part on each band of the set of bands satisfying a criterion;

means for scanning the set of bands using the order for scanning the set of bands;

means for detecting a radio link failure;

means for adjusting an energy threshold based at least in part on detecting the radio link failure; and means for acquiring a cell based at least in part on scanning the set of bands and based at least in part on an energy level of the cell satisfying the energy threshold.

\*    \*    \*    \*    \*